United States Patent
Di Giacomo et al.

(10) Patent No.: US 7,468,013 B2
(45) Date of Patent: Dec. 23, 2008

(54) TWO-ARM BELT TENSIONER

(75) Inventors: Tommaso Di Giacomo, Chieti Scalo (IT); Heinz Lemberger, Unterföhring (DE)

(73) Assignees: Dayco Europe S.r.l., Chieti (IT); Bayerische Motoren Werke Aktiengesellschaft, Munich (DE)

( * ) Notice: Subject to any disclaimer, the term of this patent is extended or adjusted under 35 U.S.C. 154(b) by 282 days.

(21) Appl. No.: 10/551,097

(22) PCT Filed: Apr. 1, 2004

(86) PCT No.: PCT/EP2004/050420

§ 371 (c)(1),
(2), (4) Date: Sep. 27, 2006

(87) PCT Pub. No.: WO2004/088171

PCT Pub. Date: Oct. 14, 2004

(65) Prior Publication Data

US 2007/0037648 A1    Feb. 15, 2007

(30) Foreign Application Priority Data

Apr. 2, 2003 (EP) .................................. 03425203

(51) Int. Cl.
*F16H 7/12* (2006.01)
(52) U.S. Cl. ..................... 474/134; 474/117; 474/135
(58) Field of Classification Search .................. 474/117, 474/133, 134, 135
See application file for complete search history.

(56) References Cited

U.S. PATENT DOCUMENTS

| 4,069,719 A | 1/1978 | Cancilla |
| 4,758,208 A * | 7/1988 | Bartos et al. ................. 474/135 |
| 6,648,783 B1 * | 11/2003 | Bogner ........................ 474/134 |
| 2002/0039944 A1 * | 4/2002 | Ali et al. ...................... 474/135 |
| 2004/0171448 A1 * | 9/2004 | Lemberger et al. .......... 474/135 |
| 2006/0217222 A1 * | 9/2006 | Lolli et al. ................... 474/134 |

FOREIGN PATENT DOCUMENTS

| DE | 3912944 A1 | 9/1990 |
| DE | 4243451 A1 * | 6/1994 |
| DE | 199 26 615 A1 | 12/2000 |
| EP | 1 420 192 A2 | 5/2004 |
| WO | WO 02/29279 A2 | 4/2002 |
| WO | WO 2004/042253 A1 | 5/2004 |

* cited by examiner

*Primary Examiner*—Bradley King
*Assistant Examiner*—Stephen Bowes

(57) ABSTRACT

In a belt drive of an internal combustion engine, a two-arm belt tensioner has a fixed tubular supporting portion; a first and a second arm fitted to the tubular supporting portion to rotate about a common hinge axis, and supporting respective idle wheels cooperating with respective branches of the drive belt; and an elastic device for forcing the arms towards each other; the elastic device having a torsionally elastic elongated member extending through the tubular supporting portion, coaxially with the hinge axis, and having respective opposite end portions projecting outwards of the tubular supporting portion; the end portions being fitted with respective end caps, one of which is fitted directly with one of the arms, and houses one end, connected integrally to the other cap, of the other arm.

17 Claims, 3 Drawing Sheets

TWO-ARM BELT TENSIONER

TECHNICAL FIELD

The present invention relates to a two-arm belt tensioner for an internal combustion engine belt drive.

BACKGROUND ART

As is known, in engine belt drives, an endless belt connects the drive shaft to an electric machine and possibly one or more auxiliary members. When using a reversible electric machine, i.e. capable of operating both as a motor and generator, in which case, the belt branches have different tensions, depending on the operating mode of the electric machine, belt tension is controlled using two-arm belt tensioners.

The most commonly used two-arm belt tensioners comprise two belt tensioning arms, which have respective hinge portions mounted to rotate on the same hinge pin about a common axis, and support respective idle pulleys, each acting on a respective branch of the belt. The two arms are loaded towards each other by a normally spiral forcing spring located between the hinge portions of the arms to force the idle pulleys against the respective belt branches and so compensate for variations in belt tension.

Though widely used, known belt tensioners of the type described above have the drawback of being extremely bulky, particularly in directions perpendicular to the hinge axis, and therefore unsuitable for highly compact combustion engines. This is mainly due to the type of forcing spring used, the size of which is determined by the spring having to provide sufficient force to ensure correct tensioning of the belt, while at the same time being flexible enough to cater to continual variations in the tension of the belt branches.

DISCLOSURE OF INVENTION

It is an object of the present invention to provide a two-arm belt tensioner designed to provide a straightforward, low-cost solution to the above problem, and in particular a two-arm belt tensioner which is highly compact, reliable and efficient, and is cheap and easy to produce.

According to the present invention, there is provided a two-arm belt tensioner for a belt drive of an internal combustion engine; the belt tensioner comprising a tubular supporting portion fixed to a fixed supporting structure; a first and a second arm fitted to said tubular supporting portion to rotate about a common hinge axis; a first and a second idle wheel fitted to respective ends of said first and said second arm and cooperating with respective branches of a belt of said drive; and elastic forcing means for forcing said first and said second arm towards each other to keep said wheels in contact with said respective branches of the belt; characterized in that said elastic forcing means comprise a torsionally elastic elongated member extending through said tubular supporting portion, coaxially with the hinge axis, and raving respective opposite end portions projecting outwards of said tubular supporting portion; a first and a second end cap located at opposite axial ends of said tubular supporting portion, and each fitted in angularly fixed manner to a respective said end portion; said second cap being fitted integrally with one end of said second arm, and defining a radial opening fitted through with said first arm; angular connecting means being interposed between said first arm and said first cap, and housed inside said tubular supporting portion and said first and said second cap.

BRIEF DESCRIPTION OF THE DRAWINGS

A non-limiting embodiment of the invention will be described by way of example with reference to the accompanying drawings, in which.

BEST MODE FOR CARRYING OUT THE INVENTION

Figure 1:
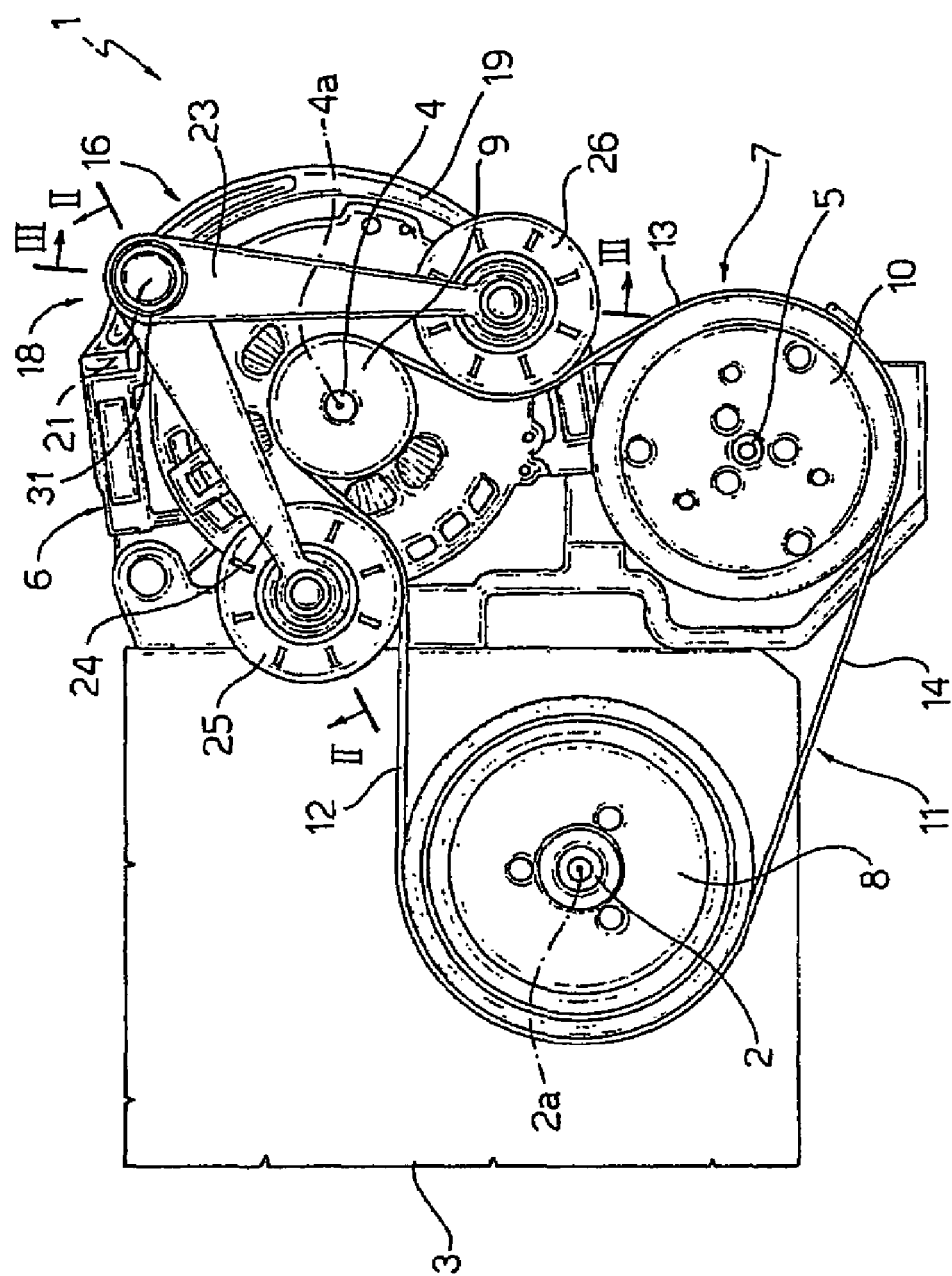
FIG. 1 shows a side view of an internal combustion engine belt drive featuring a two-arm belt tensioner in accordance with the teachings of the present invention.

Number 1 in FIG. 1 indicates as a whole a belt drive for connecting the output shaft 2 of an internal combustion engine 3 to the shaft 4 of a reversible electric machine 6, i.e. capable of operating as a current generator or motor, and to a shaft 5 of an auxiliary member 7, e.g. an air-conditioning system compressor.

More specifically, drive 1 comprises a pulley 8 fitted to shaft 2 of the engine; a pulley 9 integral with shaft 4 of the electric machine; and a pulley 10 integral with shaft 5 of auxiliary member 7. Pulleys 8, 9 and 10 are wound with an endless belt 11, which has a first branch 12 extending between pulleys 8 and 9, a second branch 13 extending between pulleys 9 and 10, and a third branch 14 extending between pulleys 8 and 10. Belt 11 is conveniently a poly-V type, and pulleys 8, 9 and 10 each have a corresponding work profile (not shown) with multiple grooves.

With reference to FIG. 1, drive 1 also comprises a two-arm belt tensioner 16 cooperating with belt 11 to ensure correct tensioning of branches 12 and 13 in any operating condition.

Belt tensioner 16 (FIGS. 1 to 3) comprises a fixed supporting structure 18, in turn comprising a curved connecting bracket 19 surrounding the outer casing or frame of electric machine 6, to which it is connected by means of screws, as shown in FIG. 1. Bracket 19 is fitted integrally with a cylindrical tubular body 20 extending coaxially with an axis 21 parallel to the axes of rotation 2a and 4a of shafts 2 and 4. Belt tensioner 16 also comprises a first and a second straight forcing arm 24 and 23, which are connected to supporting structure 18 to rotate in opposite directions about axis 21, and support respective idle wheels 25, 26 cooperating respectively with branches 12 and 13 of belt 11. Preferably, each arm 23, 24 comprises two contoured portions 27 of the same shape and size and made of pressed sheet metal. Portions 27 of the same arm face and contact each other on opposite sides of a central plane P of symmetry of relative wheel 25, 26, which plane is perpendicular to the axis A of rotation of the relative wheel. Portions 27 are connected integrally to each other, e.g. welded, riveted, or by other equivalent joining means, to define, on each arm 23, 24, a fork-shaped end portion 28, to which the relative idle wheel 25, 26 is hinged, and a root or connecting portion 29 separated from the fork-shaped end portion by a straight intermediate portion 29a. The fork-shaped end portion 28 of each arm 23, 24 has arms 28a, each of which has an integral variable-diameter cylindrical projection 28b, which, when portions 27 are connected to each other, extends coaxially with axis A towards the other projection 28b to define, together with the other projection 28b, a hinge pin to which the relative wheel 25, 26 is mounted to rotate about relative axis A via the interposition of a relative rolling-contact bearing.

Root portion 29 of arm 24 is defined by two adjacent fastening collars 30, whereas root portion 29 of arm 23 is fork-shaped, and comprises two coaxial fastening collars 31 spaced apart sufficiently to loosely house collars 30 of arm 24 in between.

Root portions 29 of arms 23 and 24 are connected to tubular body 20 by an elastic connecting and forcing device 33 allowing both arms 23 and 24 to rotate about axis 21, and which, in use, pushes arms 23 and 24 towards each other.

Figure 3:
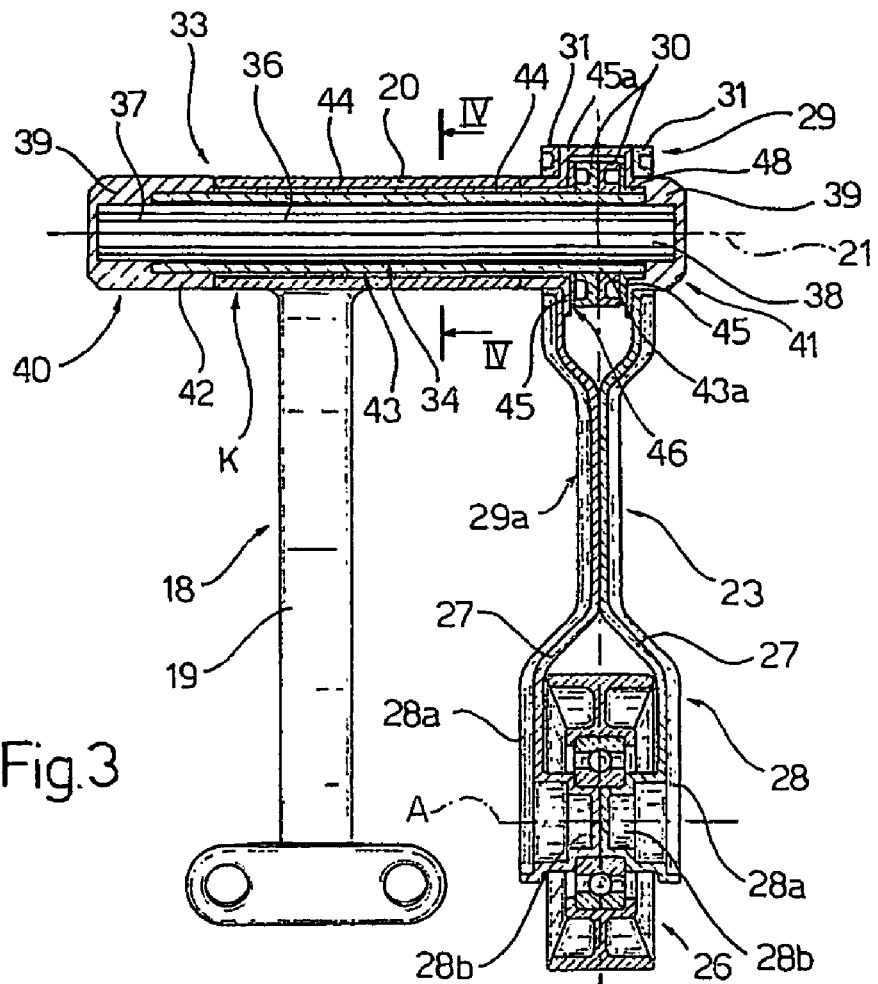
FIGS. 2 and 3 show sections along lines II-II and III-III respectively in FIG. 1.
Figure 2:
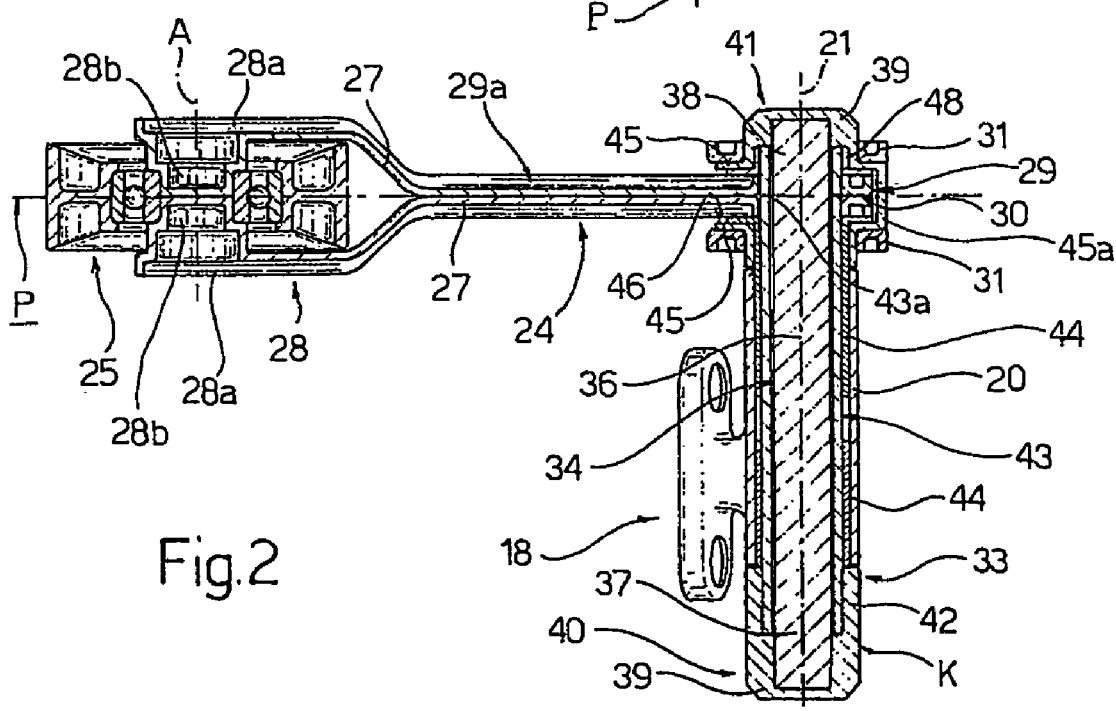
Figure 4:
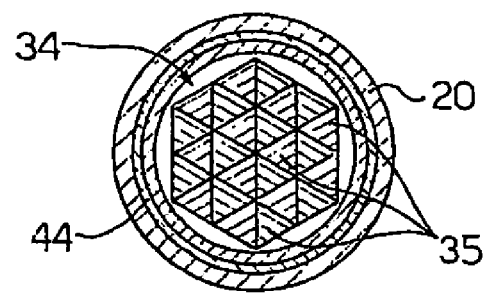
FIG. 4 shows a section, with parts removed for clarity, along line IV-IV in FIG. 3.
Figure 5:
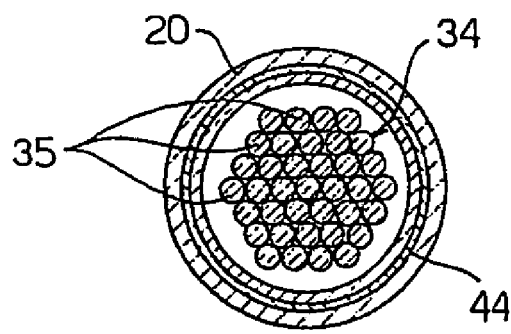
FIG. 5 shows a variation of a detail in FIG. 4.

As shown particularly in FIGS. 2 and 3, elastic device 33 comprises a torsionally elastic elongated member 34, which has a constant, conveniently hexagonal, section, extends coaxially with axis 21, and is defined by a number of parallel, adjacent, elongated bodies 35 (FIGS. 4 and 5) having respective identical sections in a plane perpendicular to axis 21. Preferably, elongated bodies 35 are cylindrical with a circular section, or prismatic with a triangular, conveniently equilateral, section. In which latter case, bodies 35 are arranged so that each lateral surface contacts a lateral surface of an adjacent body 35, as shown in FIG. 4.

Elastic member 34 comprises an intermediate portion 36 housed loosely inside tubular body 20; and two opposite end portions 37 and 38 projecting outwards of tubular body 20, and onto which are driven or force-fitted the outer end portions 39 of respective cylindrical end caps 40 and 41, which define an axial extension of tubular body 20.

More specifically, cap 40 has the same outside diameter as tubular body 20, and comprises a collar-shaped further end portion 42, opposite relative portion 39, which loosely houses elastic member 34, and in which is firmly connected an end portion of a torsionally rigid, cylindrical tubular sleeve 43 coaxial with axis 21, and whose opposite end portion 43a engages cap 41 in rotary manner about axis 21, and rests against an inner axial shoulder of cap 41. Elastic member 34 extends loosely inside tubular sleeve 43, which loosely engages tubular body 20 and is connected to the tubular body by two bushes 44 of antifriction material, one of which has an outer radial flange interposed between portion 42 of cap 40 and tubular body 20.

Cap 41 has two end portions of the same outside diameter as cap 40; and an intermediate portion having two outer radial flanges 45 spaced axially apart and joined by a curved wall 45a. Flanges 45 define respective shoulders, on each of which a relative collar 31 of arm 23 rests and is locked in angularly fixed manner. A circumferential slot 46 is formed through the lateral wall of cap 41, between flanges 45, and is fitted through loosely with intermediate portion 29a of arm 24, the collars 30 of which are housed inside cap 41, coaxially with axis 21, and are fitted to end portion 43a of sleeve 43 in axially and angularly fixed manner, conveniently by a force fit onto an externally splined portion of portion 43a. A cylindrical portion of bush 44 and a further antifriction bush 48 are interposed between cap 41 and the end portion of sleeve 43; and two rings, also of antifriction material, are interposed between cap 41 and collars 30, and located on opposite axial sides of collars 30 (FIGS. 2 and 3).

Figure 6:
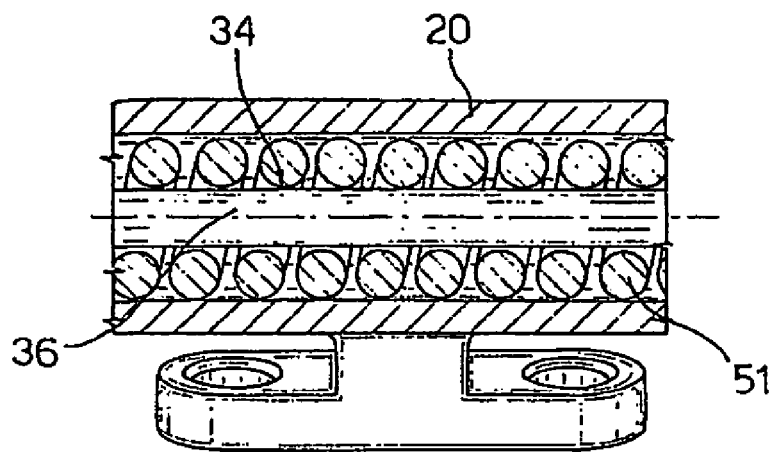
FIG. 6 is similar to FIG. 2, and shows, with parts removed for clarity, a variation of a detail in FIG. 2.

In the FIG. 6 variation, angular connecting means sleeve 43 is replaced by a further hollow, torsionally elastic member, angular connecting means wire torsion spring 51, which is connected integrally at opposite ends to cap 40 and arm 24, e.g. with the interposition of a sleeve (not shown) for supporting arm 24 and connected in rotary and axially fixed manner to tubular body 20. The further elastic member, in this case spring 51, thus defines, with elongated member 34, an elastic assembly defined by two parallel torsionally elastic bodies located one inside the other.

By providing at least one elastic forcing member coaxial with the common hinge axis of arms 23 and 24, and two straightforward end caps 40 and 41 for connecting the opposite ends of the elastic member angularly to arms 23 and 24, the resulting two-arm belt tensioner is therefore much more compact radially than conventional belt tensioners. Moreover, the particular dimensions of caps 40 and 41 provide for obtaining a belt tensioner, in which tubular body 20, cap 40 and at least part of cap 41 are housed entirely or lie within a straight cylindrical surface K parallel to axis 21, and an intermediate portion of which is defined by the outer lateral surface of fixed tubular supporting body 20 itself. Obviously, being of constant transverse size along the hinge axis, and in particular of the same size as the tubular supporting body, the range of applications of the two-arm belt tensioner is greatly increased to also include even particularly compact drives.

Using caps fitted directly to the opposite ends of the elastic member obviously also reduces production cost and, above all, assembly cost and time. Caps 40 and 41, in fact, define respective axial locating and locking stops for both the torsionally elastic member or members 43, 51, and for arms 23 and 24. The caps/torsionally elastic elongated member combination also provides for obtaining a stable assembly in which the various parts, including the fixed tubular supporting body 20 are packed tightly together by means of a single straightforward axial forcing operation, so that arms 23 and 24 operate in axially fixed positions with a constant desired amount of damping. The relative positions of all the various components involved, in fact, are ensured by being determined by respective axial shoulders.

Using caps 40 and 41 also provides for immediate, stable connection of arms 23 and 24 to the elastic forcing device. Both the arms, in fact, are simply driven axially onto respective cylindrical portions forming part of the caps directly, or of bodies connected integrally to the caps.

Making the elastic member from a bundle of elastic bodies having the same cross section and/or different contacting outer surfaces in relative motion and/or different torsional rigidities, provides for obtaining an elastic forcing body which is highly elastic, while at the same time capable of exerting the necessary force on the belt to keep the branches taut.

Striking the right balance between elasticity and applied force is also assisted by the further torsionally elastic member, e.g. spring 51, which is located compactly parallel to and coaxial with the main elastic member 34, and can be selected from a number of torsional members of different elastic characteristics. The symmetry of the arms provides for action exchange between the belt and the idle wheels, all lying in plane P; and the fact that the contoured portions of the arms are identical makes the arms modular, so that each can be made using a single die.

Finally, projections 28b integral with the arms of the fork-shaped end portions enables the wheels to be fitted to the arms with no need for screws, and simultaneously with assembly of the arms.

Clearly, changes may be made to belt tensioner 16 as described herein without, however, departing from the scope of the present invention. In particular, arms 23, 24, end caps 40, 41, member 34, and, if provided, further elastic member 51 may be formed otherwise than as described by way of example. In particular, the arms need not necessarily be curved or symmetrical; and different ways may be provided of connecting caps 40 and 41 to the torsionally elastic member or members, and the arms to the caps.

The invention claimed is:

1. A two-arm belt tensioner (16) for a belt drive (1) of an internal combustion engine (3); the belt tensioner (16) comprising a tubular supporting portion (20) fixed to a fixed supporting structure (6); a first (24) and a second (23) arm fitted to said tubular supporting portion (20) to rotate about a common hinge axis (21); a first (25) and a second (26) idle wheel fitted to respective ends (28) of said first (24) and said second (23) arm and cooperating with respective branches (12)(13) of a belt (11) of said drive; and elastic forcing means (33) for forcing said first (24) and said second (23) arm towards each other to keep said wheels (25)(26) in contact with said respective branches (12)(13) of the belt (11); characterized in that said elastic forcing means (33) comprise a torsionally elastic elongated member (34) extending through said tubular supporting portion (20), coaxially with the hinge axis (21), and having respective opposite end portions (37) (38) projecting outwards of said tubular supporting portion (20); a first (40) and a second (41) end cap located at opposite axial ends of said tubular supporting portion (20), and each fitted in angularly fixed manner to a respective said end portion (37)(38); said second cap (41) being fitted directly with one end (31) of said second arm (23), and defining a radial opening (46) fitted through with said first arm (24); angular connecting means (43; 51) being interposed between said first arm (24) and said first cap (40), and housed inside said tubular supporting portion (20) and said first and said second cap (40)(41).

2. The belt tensioner as claimed in claim 1, characterized by comprising axial locating and locking means (40, 41, 45) for keeping said elongated torsionally elastic member (34) and said first and said second arm (24)(23) in axially fixed positions with respect to said tubular supporting portion (20); said axial locating and locking means comprising said first (40) and said second (41) cap.

3. The belt tensioner as claimed in claim 2, characterized in that said axial locating and locking means comprise two shoulders (45) carried by said second cap (41); said second arm (23) resting on said shoulders and being forced onto said second cap (41).

4. The belt tensioner as claimed in claim 1, characterized in that said first (40) and said second (41) cap are force fitted onto the respective end portions (37)(38) of said elongated torsionally elastic member (34).

5. The belt tensioner as claimed in claim 1, characterized in that said tubular supporting portion (20), said first cap (40), and at least part of said second cap (41) are housed completely or lie within a straight cylindrical surface (K) parallel to the hinge axis (21); an intermediate portion of said cylindrical surface (K) being defined by an outer lateral surface of said tubular supporting portion (20).

6. The belt tensioner as claimed claim 1, characterized in that said angular connecting means comprise a torsionally rigid tubular sleeve (43) connected integrally to said first cap (40) and having an end portion (43a) engaging said second cap (41) in rotary manner about said hinge axis (21); said first arm (24) being connected integrally to said end portion (43a) of the tubular sleeve.

7. The belt tensioner as claimed in claim 1, characterized in that said angular connecting means comprise a further torsionally elastic member (51).

8. The belt tensioner as claimed in claim 7, characterized in that said further torsionally elastic member (51) extends parallel to said elongated torsionally elastic member (34), and is connected to said first arm (24) and to said first cap (40) in parallel with said elongated torsionally elastic member (34).

9. The belt tensioner as claimed in claim 8, characterized in that said further torsionally elastic member comprises at least one wire torsion spring (51) surrounding said elongated torsionally elastic member (34).

10. The belt tensioner as claimed in claim 1, characterized in that said elongated torsionally elastic member (34) comprises a number of elongated bodies (35) having the same cross section.

11. The belt tensioner as claimed in claim 10, characterized in that said elongated bodies (35) have a substantially circular cross section.

12. The belt tensioner as claimed in claim 10, characterized in that said elongated bodies (35) have a triangular cross section with substantially equal sides.

13. The belt tensioner as claimed in claim 1, characterized in that said first (24) and said second (23) arm each comprise two contoured portions (27) of the same shape and size.

14. The belt tensioner as claimed in claim 13, characterized in that said contoured portions (27) of each arm extend on opposite sides of a relative central plane (P) of symmetry of the relative wheel (25)(26), which plane is perpendicular to the axis of rotation of the relative said wheel.

15. The belt tensioner as claimed in claim 13, characterized in that said contoured portions (27) are made of pressed sheet metal.

16. The belt tensioner as claimed in claim 14, characterized in that said contoured portions contact, and are connected integrally to, each other.

17. The belt tensioner as claimed in claim 13, characterized in that the contoured portions of each arm define at least one end fork (28) having respective arms (28a); each arm of the end fork having a relative cylindrical projection (28b) forming part of a hinge pin coaxial with a relative axis (A) and to which the relative wheel (25, 26) is mounted to rotate about the relative axis (A).

* * * * *